United States Patent [19]

Kirchner et al.

[11] Patent Number: 5,706,437
[45] Date of Patent: Jan. 6, 1998

[54] SYSTEM AND METHOD FOR ACCESSING A SERVICE ON A SERVICES NETWORK

[75] Inventors: Michael Kirchner; Sridhar Krishnaswamy, both of Cedar Rapids; George Kult, Fairfield; Jeff Sackett, Iowa City; Greg Young, Cedar Rapids, all of Iowa

[73] Assignee: MCI Communications Corporation, Washington, D.C.

[21] Appl. No.: 581,744

[22] Filed: Dec. 29, 1995

[51] Int. Cl.$^6$ .................................................. G06F 15/16
[52] U.S. Cl. ................. 395/200.12; 395/200.09; 395/200.14; 395/200.2
[58] Field of Search .................. 395/200.02, 200.09, 395/200.12, 200.2, 200.14

[56] References Cited

U.S. PATENT DOCUMENTS 5,502,725  3/1996  Pohjalcallio .................. 370/94.1
5,524,253  1/1996  Pham et al. .................... 395/800
5,544,320  8/1996  Konrad ....................... 395/200.09
5,572,675  11/1996  Bergler ....................... 395/200.2

*Primary Examiner*—Kenneth S. Kim

[57] ABSTRACT

The invention provides a generic session layer protocol that enables many generic complex transactions and exchanges between a client and a service/server. The generic session layer transactions and exchanges are available via a set of programming language functions. The functions reside in the Network Information Distribution Service (NIDS) Application Program Interface (API) of an operator services network. To introduce a new service on an operator services network, only the functions are need to be used. Accordingly, each time a new service is created, new functions calls, new protocols and a new session layer do not need to be created.

15 Claims, 13 Drawing Sheets

5,706,437

SYSTEM AND METHOD FOR ACCESSING A SERVICE ON A SERVICES NETWORK

BACKGROUND OF THE INVENTION

1. Field of the Invention

The invention relates to an operator services network. More particularly, the invention relates to a generic session layer protocol that enables many generic complex transactions and exchanges between a client and a service/server. The generic session layer transactions and exchanges are available to an application programmer via a set of programming language functions.

2. Related Art

Networks are for sharing. Sharing such things as word processing and spreadsheet files, printers, communication links to distant computers and networks, and electronic mail systems is the function of a network. Every sharing activity, from car pools to bank lines, has its own rules. In networking, these rules are called standards and protocols. Standards describe how things should be; typically they set a minimum performance level. Protocols are sets of rules and agreement; they describe how elements interact. The key to understanding networking is understanding the standards and protocols that make it possible to interoperate without losing or abusing the shared files and devices.

The network evolution has swept along with it telephone technology, computer hardware design, software design, and even workgroup sociology. Today, both computers and buildings come with their networking components in place. If you have new equipment and a new building, you can add the software of your choice, plug a cable into a wall jack, and interoperate across a local area network (LAN). Wireless networks, both high-speed local networks and slower worldwide networks, link portable computers with a central business location. Modern networks mix handwritten and typed work, voice and sound, and graphics and video conferencing on the same cable.

Network operating systems are a combination of programs that give computers and peripherals the ability to accept a request for service across the network and give other computers the ability to use those services. Servers are computers that share their hard-disk drives, attached peripherals such as printers and CD-ROM drives, and communications circuits. Servers inspect requests for proper authorization, check for conflicts, and then provide the requested service.

Client software works with the internal operating system of a computer so it can route requests from application programs and from the keyboard out onto the network.

Networking has three major components: connectivity, messaging and client/server actions. Connectivity refers to the links between the network elements such as the LAN adapters and cabling. Messaging is the ability of the network to accept, store and deliver messages from an user or application program to another. Messages may be simple e-mail messages as well as sophisticated automated interactions that occur between programs as they update and share information. Some applications use network messaging services to update and exchange shared information. Client/server action refers to a task, for example, indexing and finding data in large files that the file server and client computer share.

Service companies, such as MCI, offer messaging services to subscribers. These services accept messages and files, store them, convert them to different formats, copy them into different accounts, and deliver them on demand. The basic service is often called electronic mail, but the underlying messaging service is the foundation for much more sophisticated interactions. Service companies offer access to information services such as databases of business news and statistics, searchable archives of articles, and specialized electronic libraries. These types of companies also provide a way for businesses to reach out electronically to their dealers and customers with current information and even to deliver updated versions of software products.

Client/server computing is important because it allows personal computers to access very large libraries of data without drowning in the information or swamping the network. In the client/server network architecture, the client computer sends a generalized request for information to the file server. Special software in the file server interprets the generalized request, takes the detailed steps (such as extensive indexing and sorting) needed to fill the request, and delivers the final results to the client computer. Using client/server techniques, applications running on client computers can have access to huge information databases. Client applications rely on the network for connectivity and such services as messaging and database access.

Operator services networks are set up with either a human or automated operator that receives requests for service from a user at a remote location and then establishes the appropriate service connection. Each service or service type is set up to communicate over the network with the client application via service specific transactions and exchanges called primitives. The session and transport protocol is modified to accommodate the service specific primitives. Additionally, the operators use a client application (such as a call processing application) loaded on a client computer, which is connected to the operator services network. The client application includes a client application program interface that includes a unique set of service specific function calls for communicating with a particular service within the operator services network via the primitives associated with the particular service. For each new service and/or service type that is introduced into the network, these functions have to be rewritten. As well, the session protocol must be changed. Significant labor and effort is expended to bring each new service onto the network, much of which is redundant.

What is needed is an expeditious way to bring new services onto the network without duplicating tasks every time a new service is introduced and without having to modify the network protocol every time a new service is introduced.

SUMMARY OF THE INVENTION

The invention provides generic function calls that are usable to bring any new service into an operator services network.

An advantage of the invention is that new software infrastructure does not have to be created for new services.

Generally, the present invention is directed to a system and method for setting up a new service on a services network using a set of generic functions and a generic session layer protocol such that the generic functions and generic session layer protocol can be used with any new service. With the invention, a first function is called to establish a connection between an application and the service. The first function resides in an application interface and uses the generic session protocol. A second function is called to transfer a packet between the application and the service. The second function resides in the application interface and uses the generic session protocol. A third function is called to terminate the connection between the application and the service. The third function resides in the application interface and uses the generic session protocol.

BRIEF DESCRIPTION OF THE FIGURES

The foregoing and other objects, features and advantages of the invention will be apparent from the following more detailed description of the invention, as illustrated in the accompanying drawings.

DETAILED DESCRIPTION OF THE PREFERRED EMBODIMENTS

An embodiment of the invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

I. Operator Services Network

Figure 1:
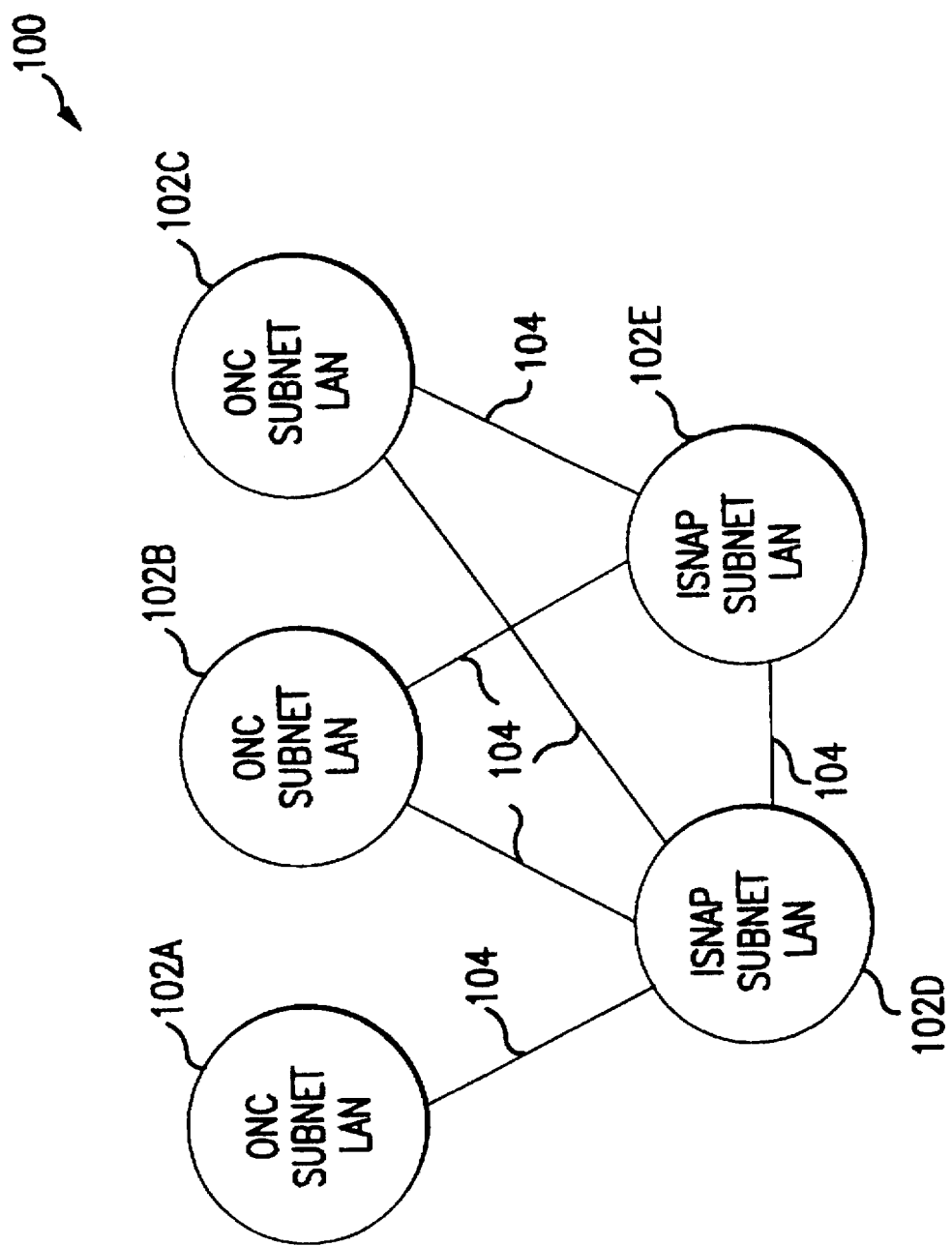
FIG. 1 shows a block diagram of an Intelligent Services Network (ISN) wide area network (WAN)

The Intelligent Services Network (ISN) is MCI's operator services network which provides both automated and manual services. The invention is described in the context of MCI's ISN for convenience. The invention is not limited to this environment. Existing services include, for example, audio service, validation service, database service and switch service. The physical architecture of the ISN is based on a routed wide area network (WAN), as shown generally in FIG. 1 at 100. WANs are used ifs permanent connection is desired between two or more geographically-distant LANs. As shown, the WAN 100 comprises a grouping of interconnected local area network (LAN) subnets 102. A router 104 connects each LAN; the router 104 transfers messages from one LAN 102 to the next. The transfer may take place over, for example, an EtherNet. LAN subnets 102 are comprised of Intelligent Services Network Adjunct Processors (ISNAPs) 102D and 102E and Operator Network Centers (ONCs) 102A, 102B and 102C.

Figure 2:
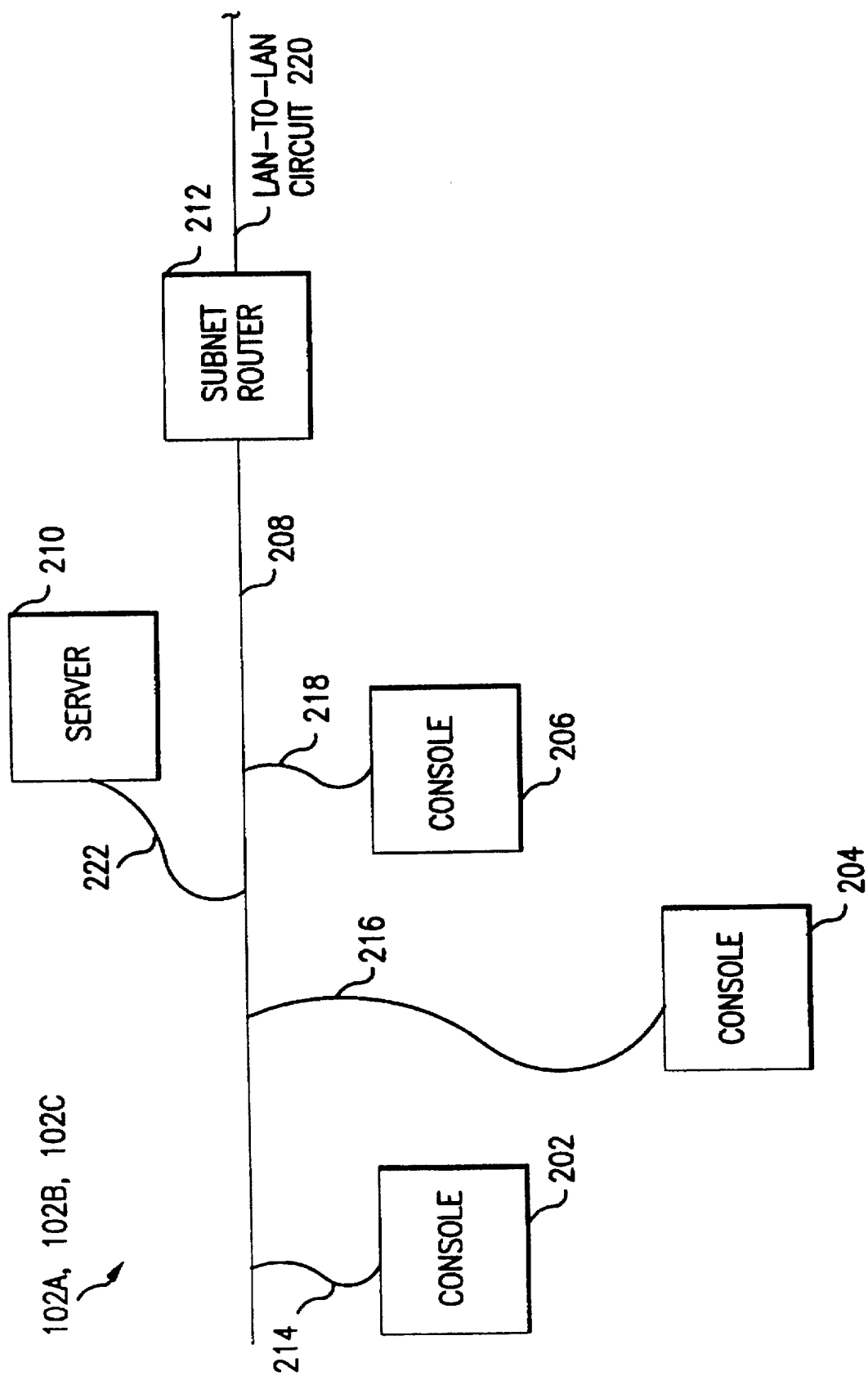
FIG. 2 shows a block diagram of the hardware associated with an Operator Network Centers (ONC) shown in FIG. 1.

As shown in FIG. 2, each ONC subnet LAN 102A, 102B and 102C includes manual operator consoles 202 and 204 and an automated operator console 206 interconnected with a network physical link 208, such as Ethernet, by conventional connector cables 214, 216 and 218, respectively. A database server 210 is also interconnected with physical link 208 by a connector cable 222. Physical link 208 connects with a LAN-to-LAN circuit 220 via a subnet router 212.

Figure 3:
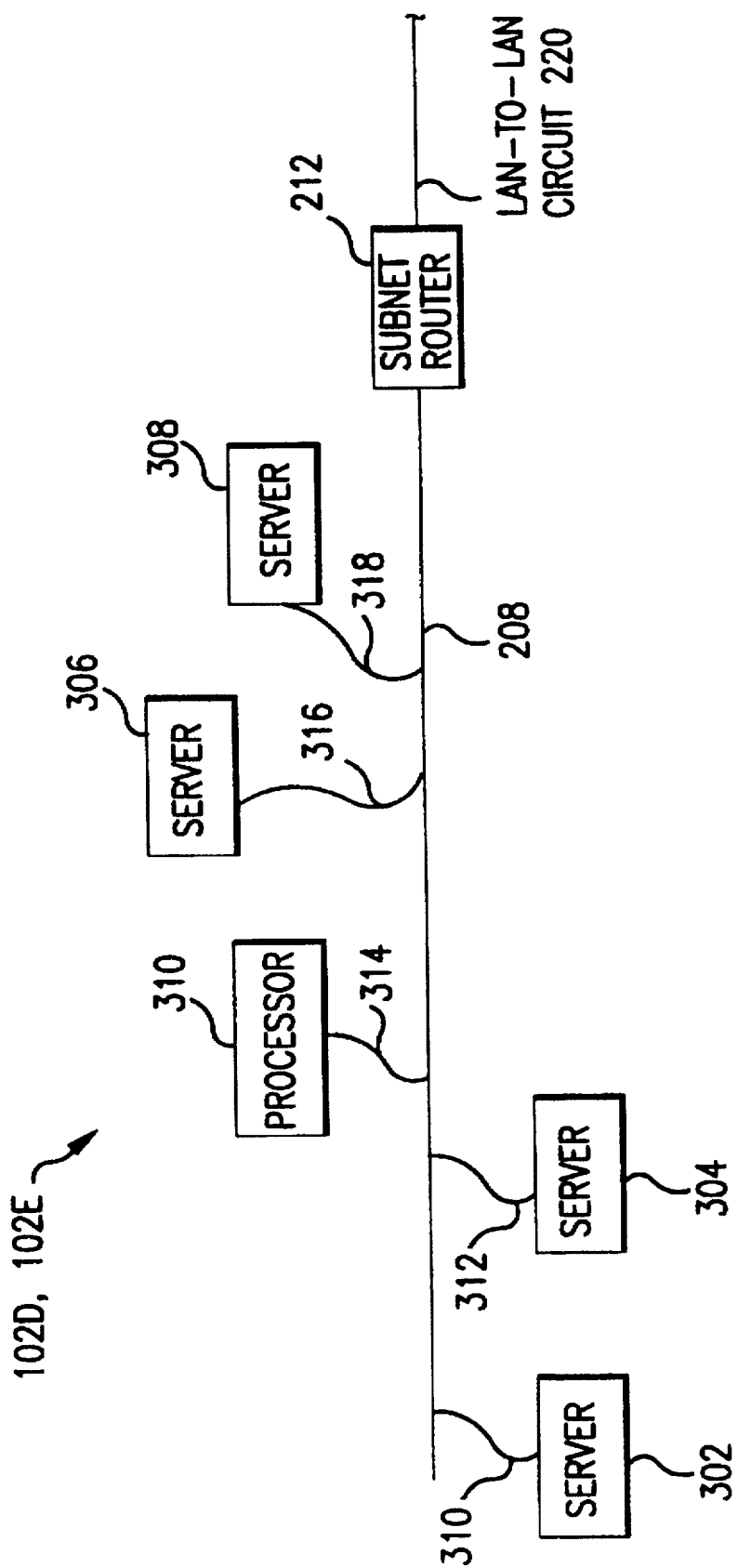
FIG. 3 shows a block diagram of the hardware associated with the Intelligent Services Network Adjunct Processors (ISNAPs) shown in FIG. 1.
Figure 4:
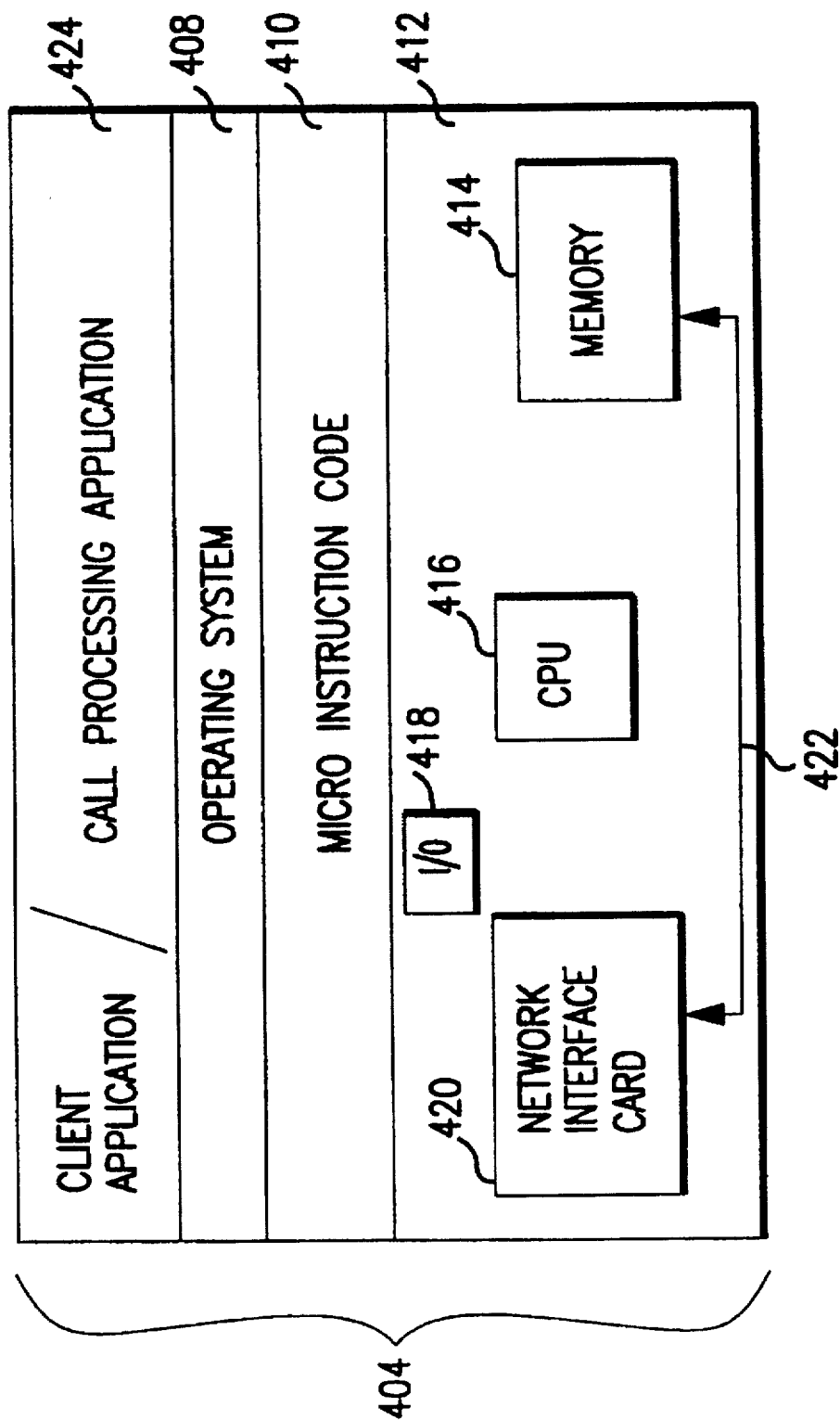
FIG. 4 shows computer platform used for the manual and automated operator consoles shown in FIGS. 2 and 3.

As shown in FIG. 3, each ISNAP subnet LAN 102D and 102E includes an audio server 302, a validation server 304, a database server 306 and a switch server 308 interconnected with physical link 208 by connector cables 310, 312, 316 and 318. An automated call processor 310 is interconnected with physical link 208 by a connector cable 314. As discussed With reference to FIG. 2, physical link 208 connects with LAN-to-LAN circuit 220.

The manual and automated operator consoles 202, 204 and 206 and automated call processor 310 comprise a computer platform shown generally at 404 for purposes of this discussion. Computer platform 404 includes hardware units 412 including one or more central processing units (CPUs) 416, a memory structure 414, a conventional input/output (I/O) interface 418 and a network interface card 420. Memory 414 and network interface card 420 communicate via a parallel transfer over an expansion bus shown generally as 422. The computer platform 404 includes an operating system 408, such as DOS, Windows and UNIX, and may include micro instruction code 410. A client application, such as a call processing application 424 uses operating system 408. The client application 424 communicates with a service application on one or more of servers 210, 302, 304, 306 and 308 as will be discussed in detail below.

Figure 5:
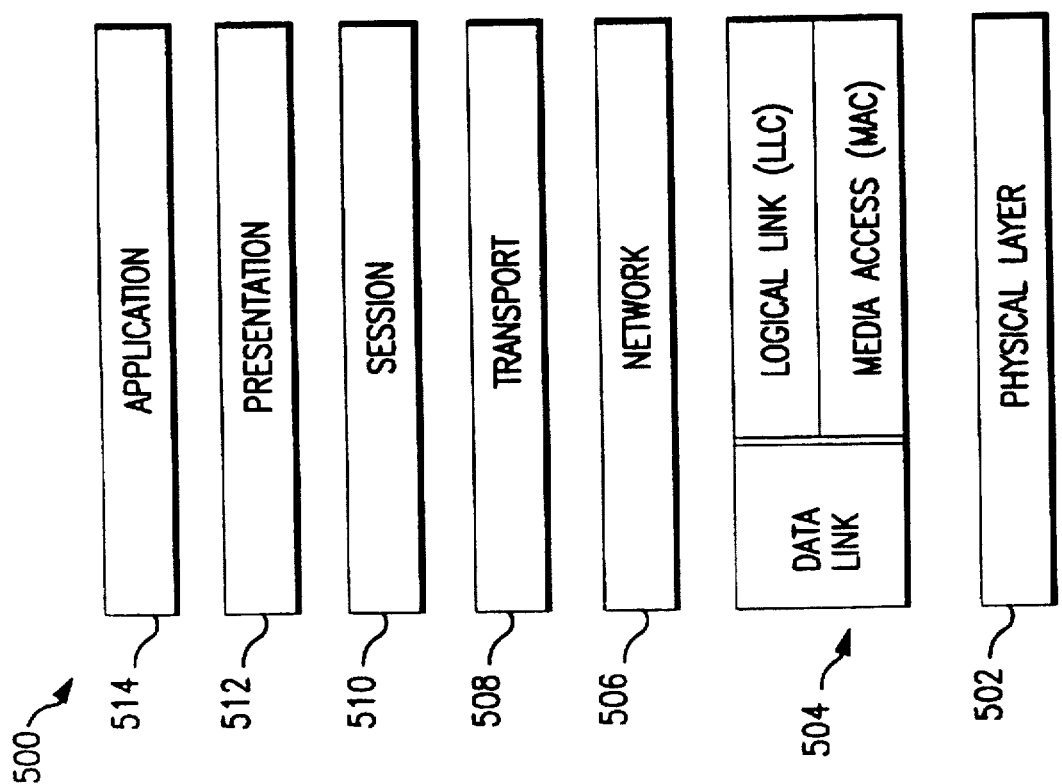
FIG. 5 shows an Open Systems Interconnection (OSI) reference model.

The LAN subnets 102 are interoperable in accordance with the Open Systems Interconnection (OSI) reference model. The OSI reference model is an international standard for the organization of LANs established by the International Standards Organization and the Institute of Electrical and Electronic Engineers. The OSI reference model establishes hardware independence in LANs. The OSI reference model separates the communication process into distinct layers as shown generally in FIG. 5 at 500. The layers include: the physical hardware layer 502, the data link layer 504, the network layer 506, the transport layer 508, the session layer 510, the presentation layer 512 and the application layer 514.

The application layer 514 is the highest level. Application layer 514 includes utility programs and application software. It interfaces with users, retrieves information from databases, and transfers whole files. The application layer 514 is the part of the OSI model that is visible to the user. The application layer 514 turns the LAN accesses into work requests that it then passes to the next layer down, the presentation layer 512. The application layer 514 does not do any real work itself, but delegates all tasks to the lower layer, the presentation layer 512. A work request to be sent across the network enters the OSI model protocol stack at the application layer 5 14, travels downward toward the first layer (the physical layer 502), zips across to the other workstation or server, and then travels back up the protocol stack until the work request message reaches the application on the other computer through the other computer's own application layer 514.

The presentation layer 512 receives work requests from the application layer 514, or it delivers a response to the application layer 514. This layer 512 exists to hide differences between different kinds of computers. When different types of computers all want to talk to each other, some translation and byte-reordering is necessary. This presentation layer 512 converts data into (or from) a machines's native internal number format. The presentation layer 512 also compresses the messages into an encrypted form, for security purposes. When delivering messages, the presentation layer 512 encrypts the messages. Once its job is finished, the presentation layer submits its results to the next layer, the session layer 510.

Computers on LANs use names or numbers to identify each other. The session layer 510 uses each computer's identification to call another computer, in the same way one uses a telephone number to make telephone calls. The session layer 510 makes the initial contact and manages the progress of the call. The call itself is a session—an exchange of messages (a dialog) between two workstations or a workstation and a server. The functions in this session layer 510 enable applications at two different locations to coordinate communications into a single session.

The transport layer 508 is the only layer that concerns itself with making sure that the information sent by one computer on the network is received properly by another computer. The transport layer 508 knows the maximum size of each LAN packet and breaks up a work request message (or response) into smaller packets as necessary. When more than one packet is being process at any one time, this layer controls the sequencing of the message packets and also regulates inbound traffic flow. If a duplicate packet arrives (perhaps the result of a retransmission), this layer recognizes and discards it. The transport layer 508 delegates the work of routing packets to the next lower layer, network layer 506.

The network layer 506 plans the routing of the packets. The message packets may need to travel through several LAN segments to get to their final destinations. The network layer 506 keeps track of the different routes that a message packet may need to travel. The network layer 506 inserts this routing information into each message packet, to help the intermediate computers and devices forward the message packet to its destination. This layer takes responsibility for addressing and delivering messages, end-to-end, from source computer to final destination.

The data link layer 504 is the most complex. It encompasses the sending of the characters that make up a message packet on a character-by-character basis. Because of its complexity, the data link layer 504 is broken into a Media Access Control (MAC) layer and a logical link control (LLC) layer. The MAC layer manages network access (token-passing or collision-sensing, for example) and network control. The LLC layer, operating at a higher level than the MAC layer, sends and receives the user data messages and packets (typically file service request and responses). If the data link layer 504 detects an error, it arranges for the sending computer to retransmit the message packet. The error detection is only point-to-point; the sending computer may be only forwarding a message from the originating computer. The transport layer has control and responsibility for end-to-end delivery.

The physical layer 502 only needs to turn the characters making up a message packet into electrical signals. This layer does not need to process routing information, computer names, or the other contents of a message packet. Because the other layers already have done their supervisory work, the physical layer 502 merely has to send or receive the electrical signals through the LAN cable. This part of the OSI model 500 specifies the physical and electrical characteristics of the connection that make up the network. It encompasses things like twisted pair cables, fiber optic cables, coaxial cables, connectors, repeaters, and so on.

The present invention will be discussed with respect to LANs utilizing the UNIX operating system, although the present invention may be used in any of the available operating systems. The UNIX computer may act as a file server by using software at the UNIX host computer that accepts requests from workstations, processes those request, and returns the appropriate response to the workstation. UNIX applications can be run alongside the file server software. The UNIX operating system can use the Transmission Control Protocol/Internet Protocol (TCP/IP) suite to send data among computers. TCP/IP is a layer of protocols, not a network operating system. IP provides datagram communications between nodes on a network. Because TCP/IP is a public, not a proprietary, protocol, it has become extremely popular as the basis for interconnecting LANs from different vendors. TCP/IP works on a peer networking concept. All computer systems connected by a TCP/IP network are peers from the network's viewpoint, although some computers will have more function and capabilities than others, of course. The architecture of TCP/IP is based on a layer of protocols and the Internet address, a standard computer-identification scheme. On a local or wide-area basis, TCP/IP routes messages between networks and between computer systems on each network.

Figure 6:
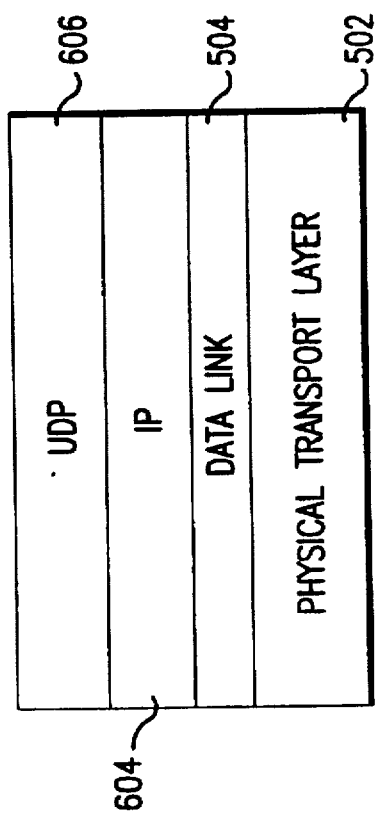
FIG. 6 shows the kernel space of a UNIX based protocol stack.

TCP/IP consists of two protocols, IP and TCP. Often, though, people use TCP/IP as a generic name for a collection of protocols and utility software programs. FIG. 6 shows the relationship of these peer protocols. FIG. 6 shows only the kernel space of the protocol stack. Physical layer 502 underneath TCP/IP can be EtherNet or another physical medium for sending and receiving packets of information. Both LANs and WANs can use TCP/IP to exchange information. IP layer 604 is the first, lowest layer of TCP/IP and is above the data link layer 504, which is above the physical layer 502. User Datagram Protocol (UDP) layer 606 is one type of TCP/IP protocol that uses IP. Another intermediate protocol that uses IP is the Internet Control Message Protocol (ICMP). ICMP enables the exchange of control and error message between IP hosts.

The basic unit of information exchange is a datagram packet, which will be discussed in greater detail with reference the FIG. 14 in the following discussion. The IP portion of TCP/IP provides for the routing of packets from computer to computer, and this is the only job it does. Higher level protocols and software do not concern themselves with the routing of packets. The IP protocol layer on a network can forward datagrams to their destinations without help from higher level protocols. IP does not guarantee delivery of packets.

UDP uses IP to send and receive messages. UDP does not provide for guaranteed delivery of messages. Computer programs that use UDP must implement their own checks for delivery, retransmission and error recovery. However, UDP is relatively fast.

Figure 7:
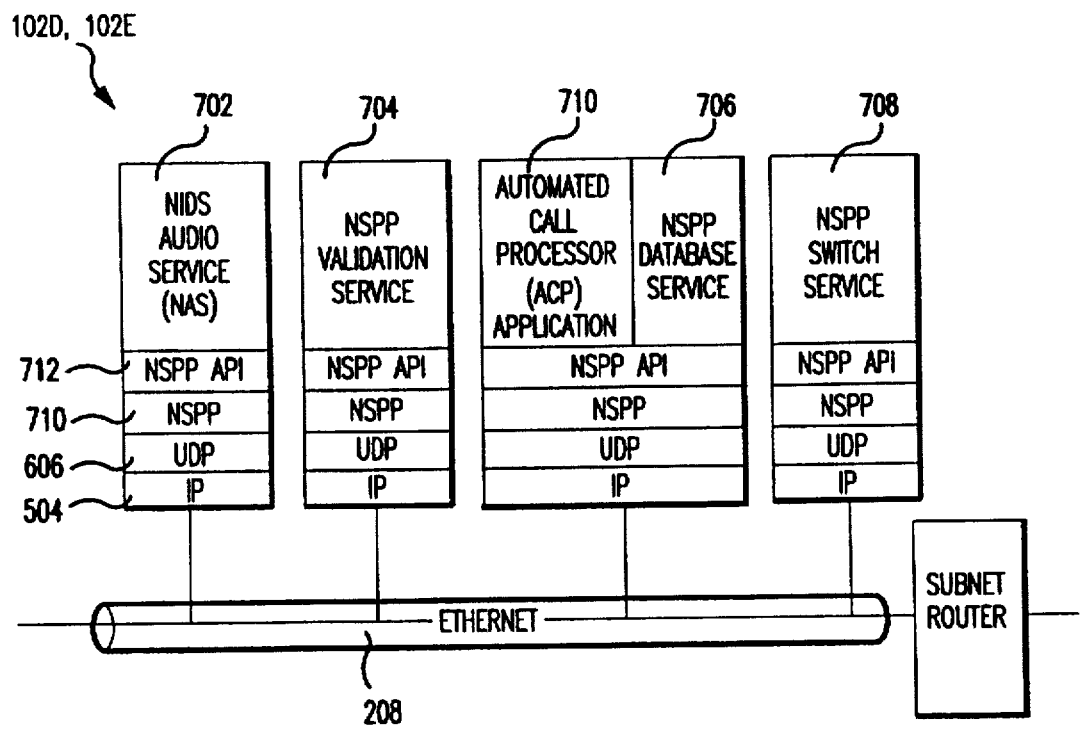
FIG. 7 shows the ISNAP components.

As shown in FIG. 7, ISNAP subnet LANs 102D and 102E include associated hardware discussed in FIG. 3. Services shown generally at 702, 704 and 706 are provided by application programs executing in the ISNAP subnet LANs 102D and 102E. Services 702, 704 and 706 comprise Network Information Distribution Service (NIDS) audio service 702, NIDS Sequenced Packet Protocol (NSPP) validation service 704 and NSPP database service 706 and reside on servers 302, 304 and 306, respectively. Services 702, 704 and 706 are needed to interface with an operator services switch NSPP 708 which resides on server 308. ISNAP subnets LANs 102D and 102E also include components of the automated operator services needed for an Automated Call Processor (ACP) application 710, which resides on processor 310. ACP application 710 and database service 706 are shown together. However, they may reside on independent platforms as illustrated in FIG. 3 by processor 310 and server 306.

Figure 8:
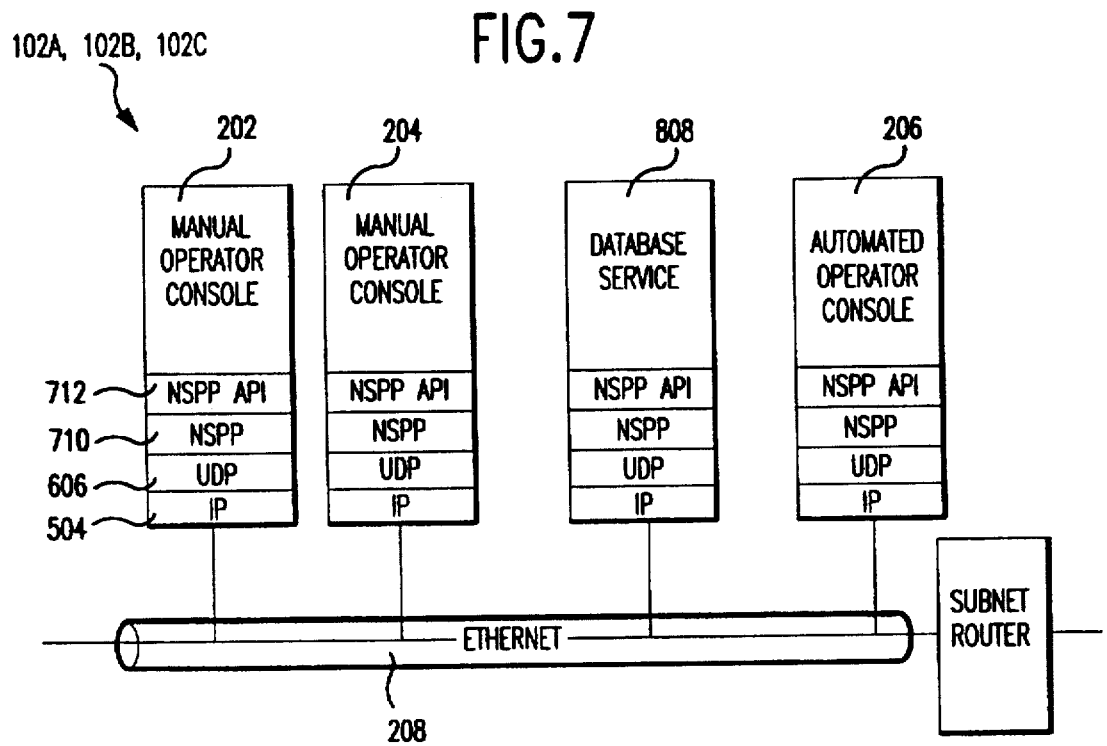
FIG. 8 shows the ONC components.

Referring now to FIG. 8, ONC subnet LANs 102A, 102B and 102C contain manual operator console platforms (PC based) 202 and 204, automated operator console platform (PC based) 206 and a database service 808, which resides on server 210. Switch and validation services for ONC subnet LANs 102A, 102B and 102C are obtained from the associated NSPP switch service 708 and NSPP validation service 704 in ISNAP subnet LANs 102D and 102E.

As shown in FIGS. 7 and 8, between UDP layer 606 and each layer 702, 704, 710, 706, 708, 202, 204, 808, respectively, and 206 is a NSPP protocol layer including a NSPP layer 710 and a NSPP Application Program Interface (API) layer 712. NSPP layer 710 is a communications layer that provides fast reliable transport environments for client/server communications. Client applications make requests of service applications and the services respond as needed. For example, a database query will remit in returning the database lookup results. The NSPP API layer 712 is a session layer.

The NSPP protocol is supported on several different operating systems, such as, UNIX, DOS (clients only), OS/2, VOS (Stratus, clients only), VMS (VAX) or Open VMS (Alpha). The implementation of NSPP differs slightly under each of these operating systems due to performance considerations, such as multitasking capability, process overhead, and thread support. The scope of this patent application, for purposes of discussion, however, is the UNIX(AIX), OS/2, DOS, OSF/1 and VOS client API's.

II. Client Overview

Figure 9:
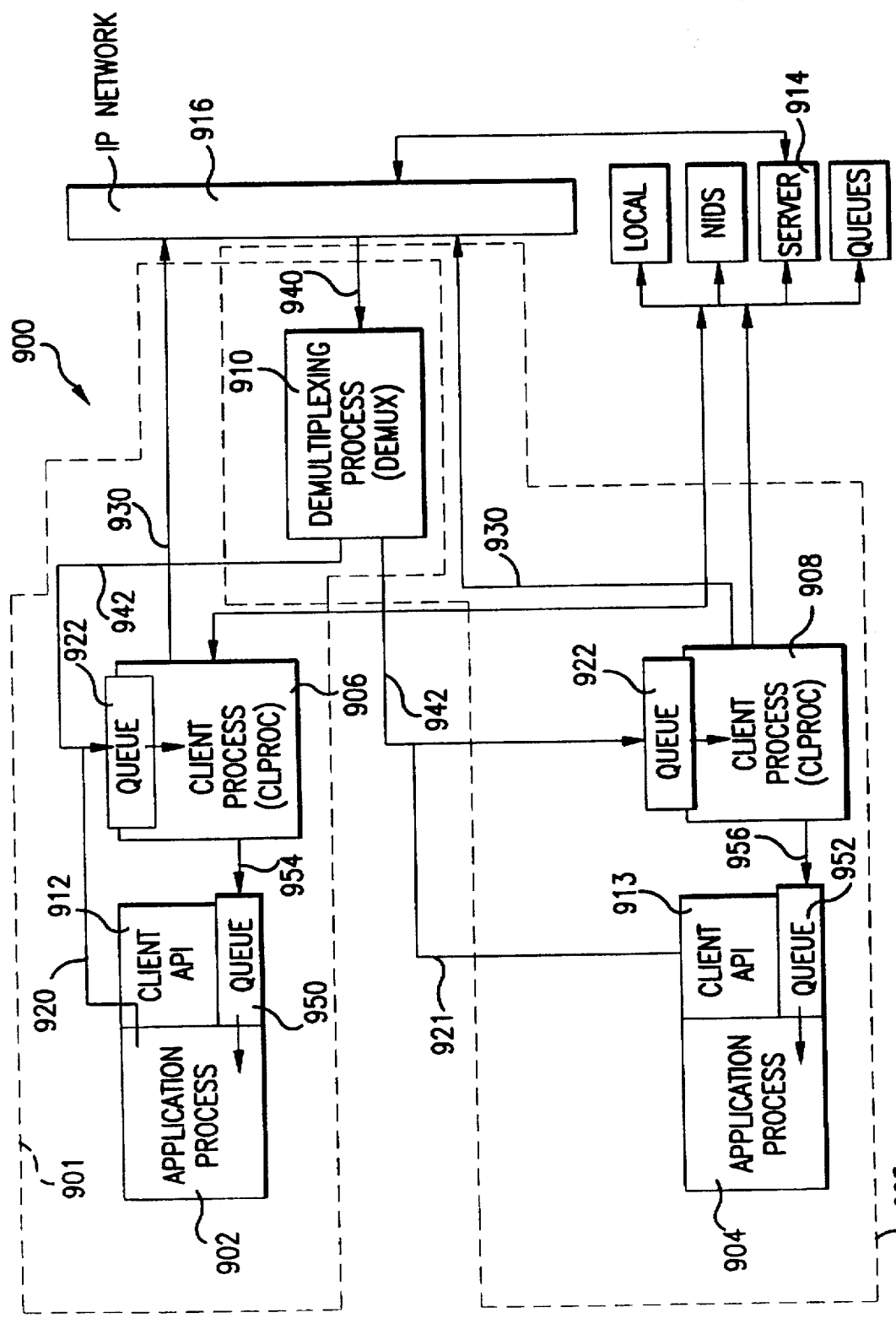
FIG. 9 shows the client application process.
Figure 11:
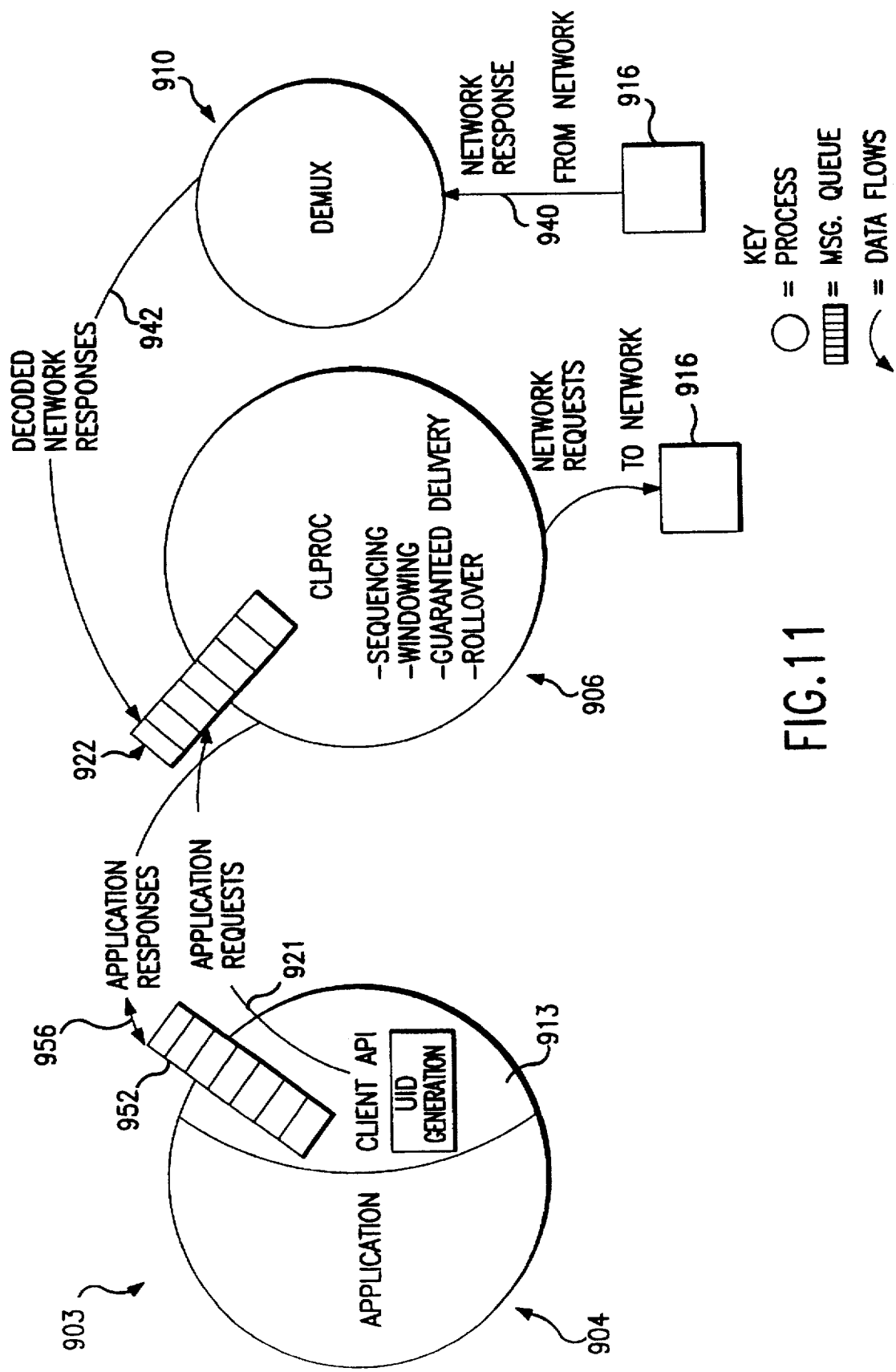
FIG. 11 shows the self contained model.
Figure 12:
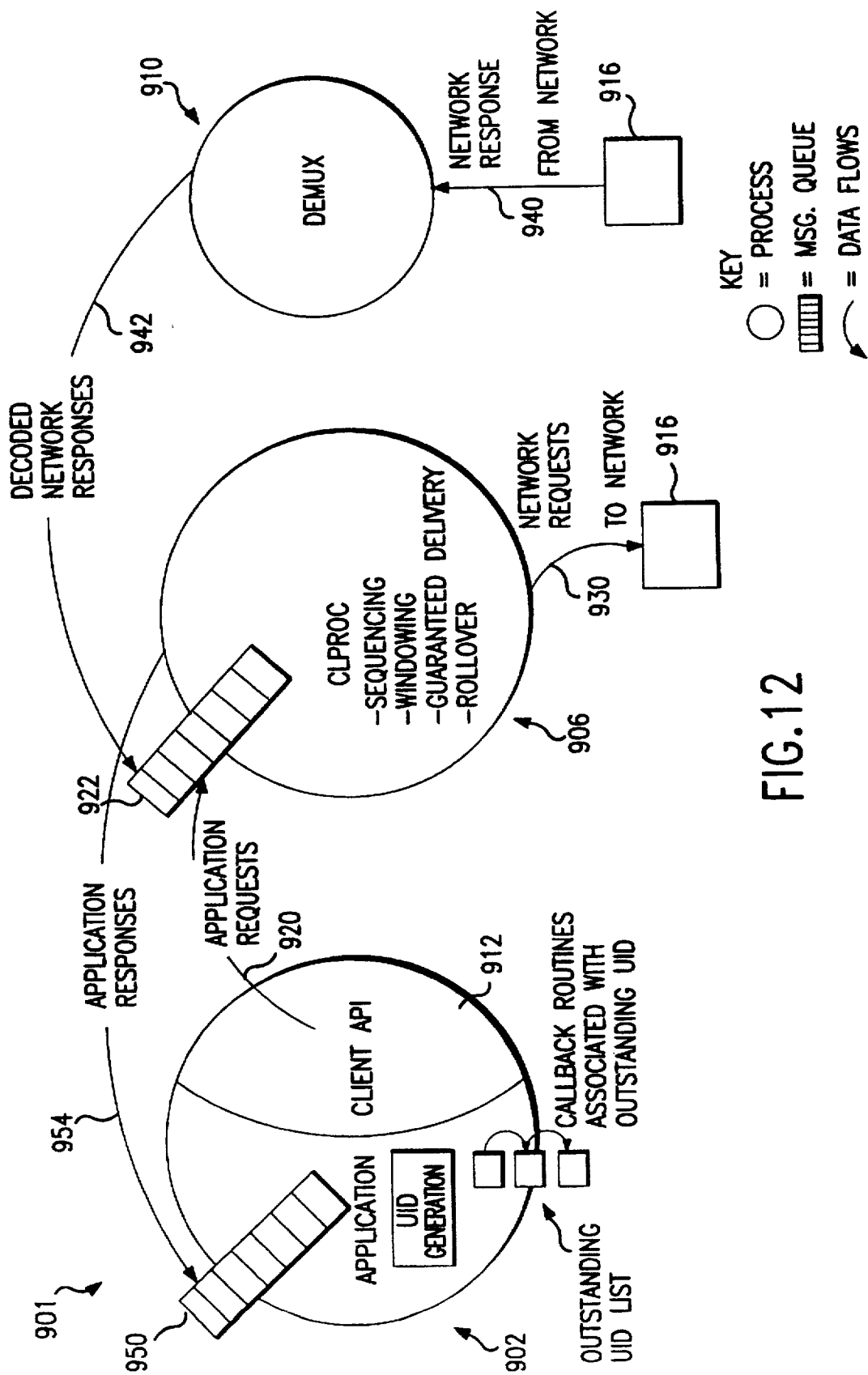
FIG. 12 shows the ARU style model.

Referring now to FIGS. 9, 11 and 12, the NSPP client environment is shown generally at 900 in FIG. 9. Hardware supporting an ARU style model application process is delineated by dashed line 901. The ARU style model application process is illustrated in FIG. 12. Hardware supporting the self contained model process is delineated by dashed line 903. The self contained model process is illustrated in FIG. 11. Application processes 902 and 904 may comprise, for example, applications residing on any of the manual and automated consoles 202, 204 and 206 or 710. Server 914 is intended to represent any of the servers 210, 302, 304, 306 and 308, with which the client application needs to communicate. The IP network 916 collectively represents UDP layer 606, IP layer 504 and Ethernet 208.

In the NSPP client environment 900, each application process 902 and 904 has its own client process (CLPROC) 906 and 908, respectively, to handle NSPP communications. The NSPP client demultiplexing process (DEMUX) 910 is shared by every application. Incoming messages from an end user are matched with the appropriate client application 902,903.

Each application process 902 and 904 interacts with the NSPP communications via a client application program interface (API) 912 and 913. The API 913 shields, and the API 912 partially shields, the application processes 904 and 902, respectively, from the complexity of NSPP communications. The APIs 912 and 913 also handle the sequence of messages required to establish service connections, time-outs, retries and other recovery procedures from communications errors.

The client application processes 902 and 904 use the client APIs 912 and 913, which include a library of generic functions as will be discussed below, to connect to and communicate with the desired service module at a server 914. API functions 912 and 913 are called to make application requests for a service to the CLPROCs 906 and 908. Specifically, the function calls in the client APIs 912 and 913 will encode a NIDS message and write the NIDS message and its associated data to the CLPROCs 906 and 908 via a combined shared memory and UNIX message queue mechanism 922. In the CLPROCs 906 and 908, an NSPP header is added to the NIDS message. The path of the queue mechanism 922 between the client applications 902 and 904 and the CLPROCs 906 and 908 is shown by arrows 920 and 921, respectively. Because of the system resources within the application process 902 (ARU style model), the arrow 920 showing the path of the request message is shown to originate in the application process 902. For application process 904, the unique identification is generated within the client API 913. Thus, the arrow 921 showing the path of the request message is shown to originate at the client API 913.

The CLPROCs 906 and 908 each determine the destination server, for example, server 914, and send the NSPP message (the coded application request) to the network 916 as shown by arrow 930, and guarantees delivery of the NSPP message to the server 914.

Network response messages 940 from server 914 are received via the network 916 by the NSPP DEMUX 910. The response messages 940 include information obtained from the service on the server 914, but actual initiation of such response is provided for in the API function call. In DEMUX 910, the network response messages 940 are decoded and written to the memory message queue mechanism 922 in the appropriate CLPROCs 906 or 908. The path of decoded network responses between DEMUX 910 and memory message queue mechanism 922 in CLPROC 906 is shown by arrow 942. The CLPROCs 906 and 908 read the application request message from the memory message queue mechanism 922, match the network response message with the application request message, and arrive at an application response, which is stored in a message queue 950 or 952.

In the ARU style model, as shown by dashed lines 901 and FIG. 12, the message queue 950 is sent to the application process 902 via a path 954. In the self contained model, the message queue 952 is sent to the client API 913 via path 956.

DEMUX 910 handles all NSPP messages from the network by providing a single known port (i.e., socket B000) which serves as the destination for all server messages. DEMUX 910 listens on this socket, decodes a network response 940, and passes the decoded network response 942 to the appropriate memory message queue mechanism 922 in the CLPROC 906 or 908. The DEMUX 910 also receives server pulses and creates the shared memory segment used to communicate with the CLPROCs 906 and 908.

Figure 13A:
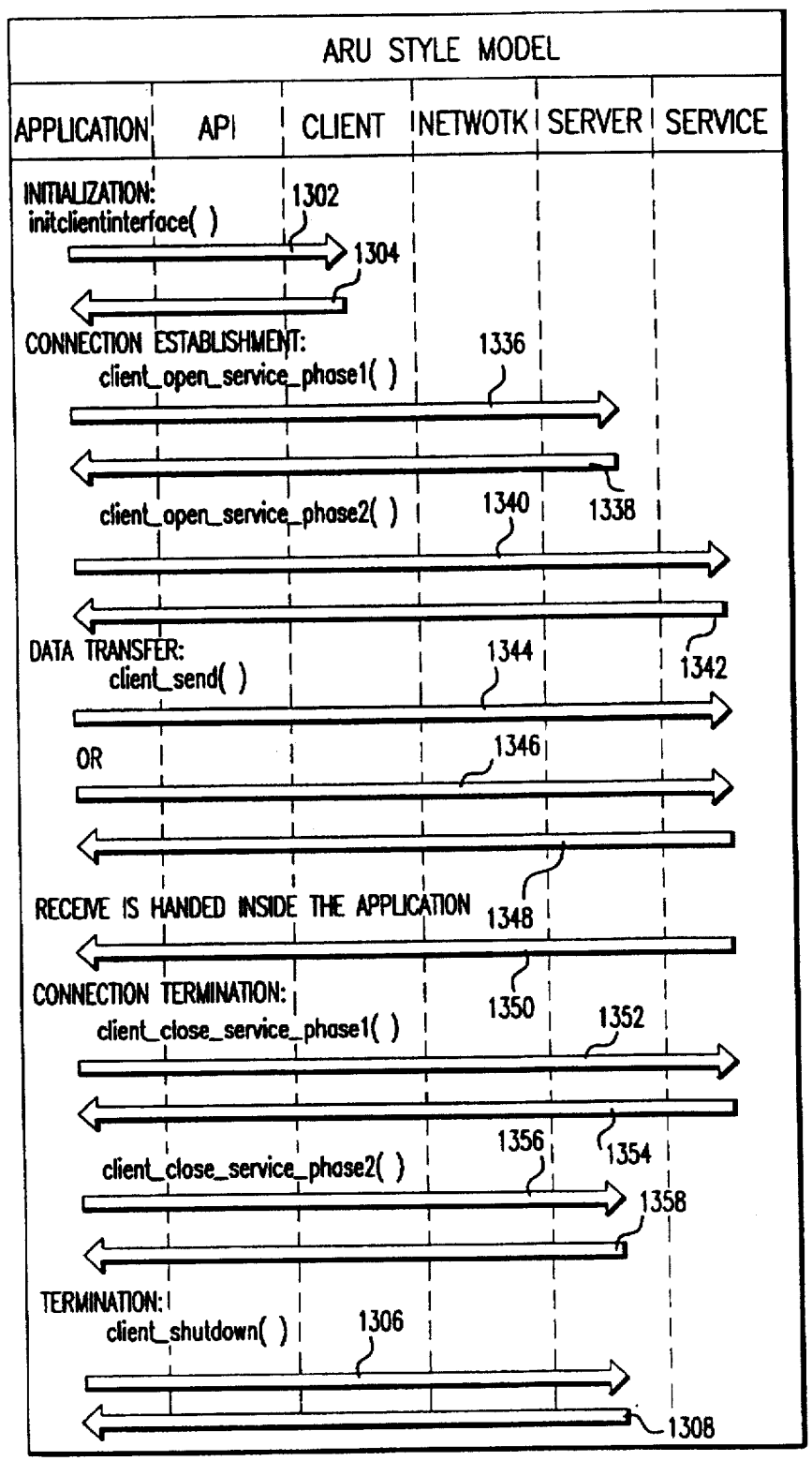
FIG. 13 shows the magic service type for both the ARU style model and the self contained model.
Figure 13B:
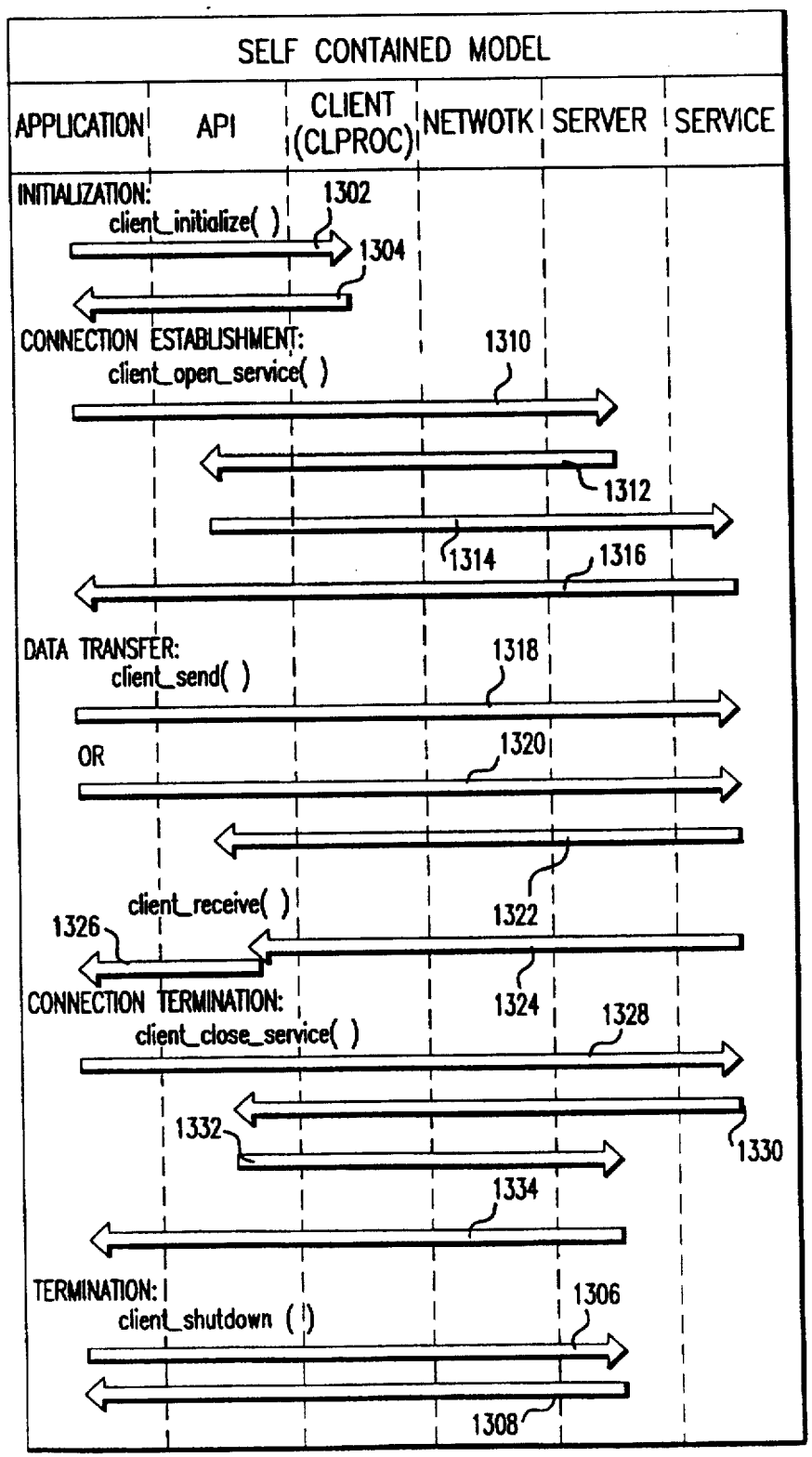

In summary, the client APIs 912 and 913 are used by the client processes 902 and 904 as an interface for communicating with the NSPP services residing on servers on the operator services network via generic session layer protocols, which will be discussed with reference to FIG. 13.

A. Self Contained Model versus ARU Style Model

As discussed above, the client software supports two models of API calls based on different approaches. The Self Contained Model shields the client application from the details of queue management and buffer allocation. System memory is passed to the API. The API is then responsible for allocating the NIDS buffers and management of the message queues. As discussed above, FIG. 11 and dashed line 903 in FIG. 9 illustrate the self contained model. FIG. 12 and dashed line 901 in FIG. 9 illustrate the ARU style model. The ARU Style Model optimizes performance of the system by allowing the application to handle the details of NIDS message queue management and buffer allocation. Basically, the NIDS IPC mechanisms allow for very rapid transfer of data between applications and can be used to avoid the memcpys associated with application transfer of memory.

B. Data Encapsulation (NSPP)

Figure 14:
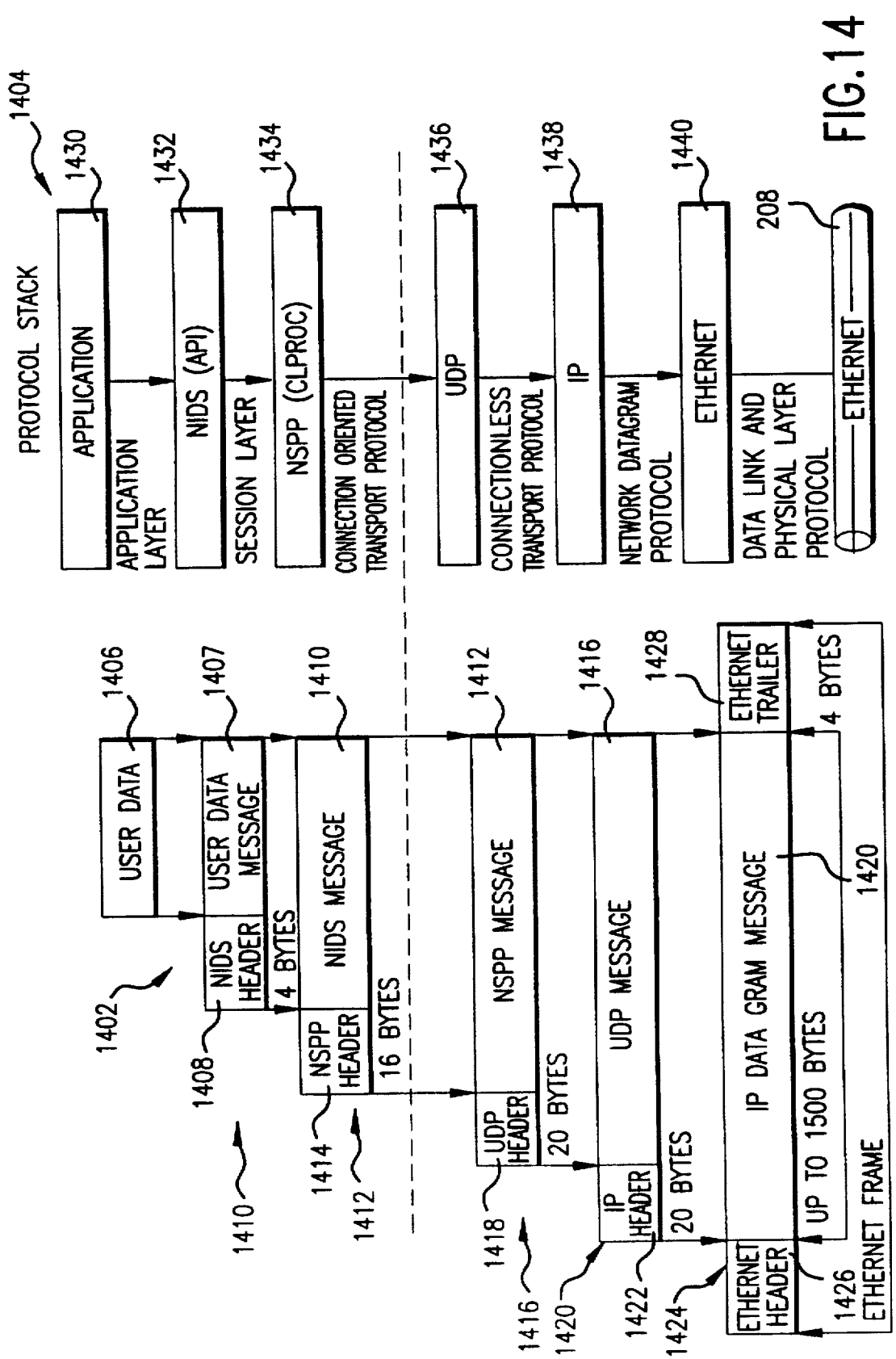
FIG. 14 shows the high level data encapsulation method used for NSPP.

FIG. 14 describes the high level data encapsulation method used for NSPP. The IP data gram, shown generally at 1402, is sequentially constructed as it passes through the protocol stack 1404. The IP data gram comprises user data 1406; a NIDS message 1410, which includes NIDS header 1408 and user data/message 1407; an NSPP message 1412, which includes NSPP header 1414 and NIDS message 1410; an UDP message 1416, which includes an UDP header 1418 and NSPP message 1412; an IP data gram message 1420, which includes an IP header 1422 and UDP message 1416; an Ethernet message 1424, which includes an Ethernet header 1426, an Ethernet trailer 1428 and IP datagram message 1420.

Protocol stack 1404 includes application layer 1430, API/NIDS layer 1432 as a session layer, CLPROC/NSPP layer 1434 as the connection oriented transport protocol layer, UDP layer 1436 as the connectionless transport protocol layer, IP layer 1438 as the network datagram protocol layer, Ethernet layer 1440 as the data link and physical layer and Ethernet 208.

The user data 1406 is supplied by the application. The API function call generates the NIDS message 1410 with the NIDS header. The CLPROC adds the NSPP header to the NIDS message. Then, the UDP and IP headers are added to form the IP datagram that is passed over the Ethernet. To remove the IP datagram from the Ethernet, the IP datagram is broken down in the reverse order as the protocol layers are passed through in an ascending order from the data link and physical layer protocol 1440 to the application layer 1430, rather than the descending order just described.

III. Client/Server Support

Figure 10:
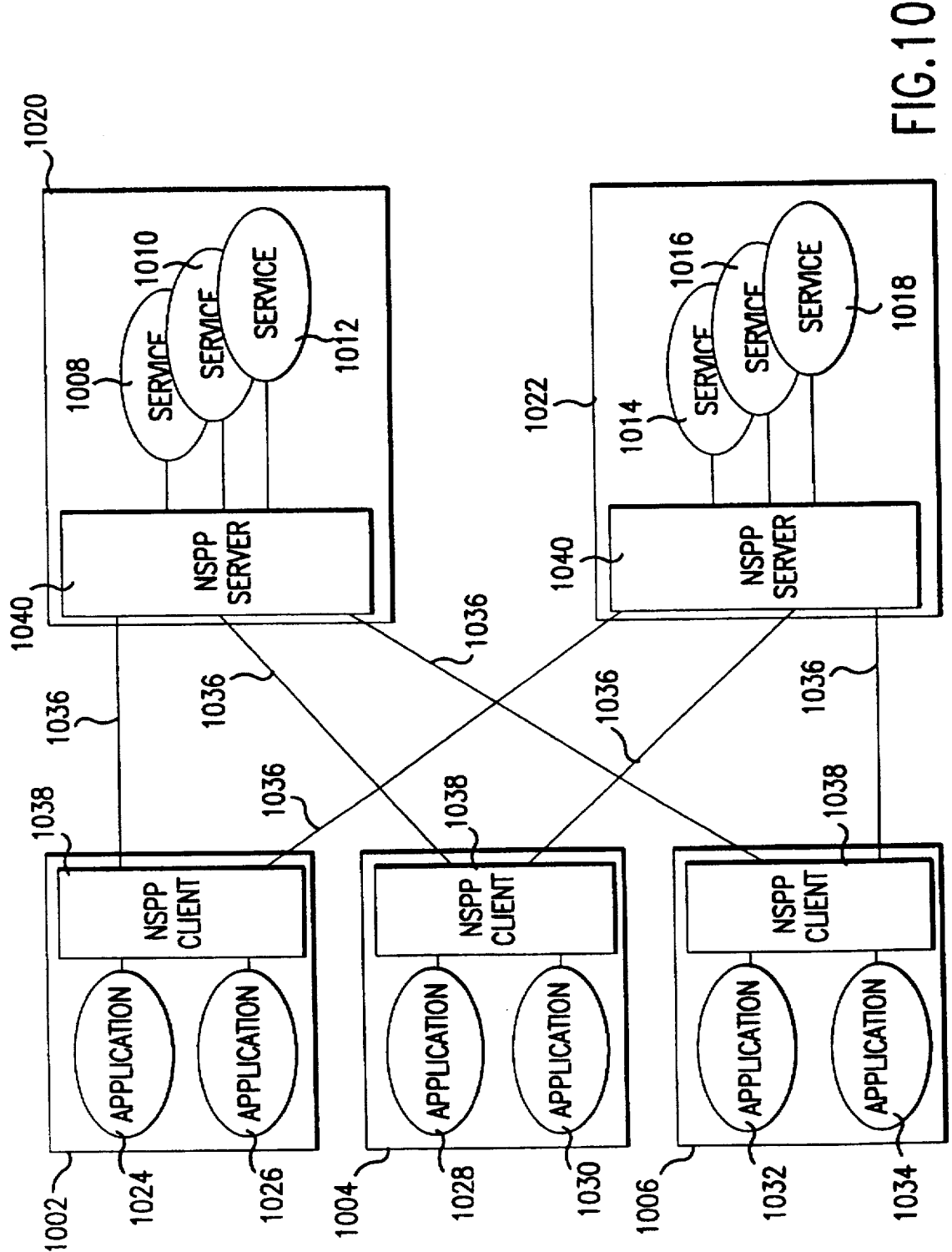
FIG. 10 shows the NSPP many to many client/server connections.

The NSPP communications environment supports many-to-many connections as shown in FIG. 10. This means that a single client 1002, 1004 or 1006 may simultaneously be connected to several different services 1008, 1010 and/or 1012 on the same server 1020 (or services 1014, 1016 or 1018 on server 1022) or any of services 1008, 1010, 1012, 1014, 1016 or 1018 on either server 1020 and/or 1022. Also each service may be supporting many different clients 1002, 1004 and/or 1006. Each client 1002, 1004 and 1006 includes any number of applications 1024, 1026, 1028, 1030, 1032 and/or 1034. The connections between clients on one machine and services on another are handled across shared communication links 1036, which communicate between, for example, NSPP client 1038 and NSPP server 1040. Each client 1002, 1004 and 1006 has a NSPP client 1038 and each server has a NSPP server 1040.

IV. Service Types and Services

Conventionally, in the operator services network, there are five different service types each with its own unique library of function calls in the API of the client application to enable interoperation between the client application and the services via a service specific session layer and service specific primitives. Existing services all fit into one of these five service types. New services are always being introduced into the operator services network. However, if the new service cannot be carded out by one of the existing service types then a new service type with an entirely new set of function calls, a new session layer and new primitives are established. Overtime, with the introduction of more and more services, this will result in an unwieldy mount of services types being established and existing on the operator services network.

To overcome these problems, Applicants have developed a generic service type that will accommodate any service. This generic service type is stored in the service type entry in the NIDS message header. The generic service type includes a generic session layer protocol including generic transactions and exchanges (primitives) for establishing connection, transferring data and terminating connection between a client and a service. The operation codes for these generic primitives are stored in the NSPP message header operation code, which is in the NIDS header.

A set of generic function are stored in the API of the client application. The generic functions, when called, implement generic transactions and exchanges between a client and service using the generic session layer protocol. The generic transactions and exchanges are illustrated and discussed with reference to FIG. 13.

The functions in the client API are preferably written in C programming language. The API and client code are preferably written in an operating system neutral form. As an example, the client model uses an operating system which allows multi-tasking and supports interprocess communications. An OS/2 client was compiled using version 2.1 of the IBM CSET compiler. The executable runs on a 2.X version of the OS/2 operating system and uses IBM's TCP/IP protocol suite to be available for the designated network card. Other languages and compilers and compilation tools could alternatively be used.

With the use of the set of generic function calls, the network developers no longer need to be involved with set up of new services because the foundation is already in place; the set of generic functions have already been integrated into the operator services network. Therefore, the application developers simply have to rely on the set of generic function calls to install the new service. From the perspective of the application developers, the set of generic function calls serve as a preestablished conduit between the application and the service. The application programmer picks and chooses from the set of generic functions calls as needed to set up the new service.

V. Application Program Interface for Client Interface

A. Overview

This section of the patent application describes the client API for the AIX NSPP client interface as implemented for AIX and OS/2 platforms. It should be understood that the following discussion is also applicable to other platforms.

B. Initialization/Termination

Initialization and termination are pre- and post- cursors to the process of accessing any service. As shown in FIG. 13 by arrows 1302 and 1304, initialization establishes communication between the application and the CLPROC by setting up the message queue and shared memory that are needed during service access. Termination shown by arrows 1306 and 1308 closes the server connection and reallocates the memory queue.

This initialization and this termination are carded out in accordance with conventional session request/response and pick request/response communications. The session request/response is a way to associate the client and server. The pick request/response is a way to associate a client application and a service. Therefore, these functions are compatible with either existing client API functions for existing services types, which will not be discussed in detail in this patent application, and/or new client API generic functions, which are the subject of this patent application and are usable for any new service that is to be included on the operator services network.

Notably, although it is within the scope of the invention to use the API generic functions of the present invention with existing services, it may not be economically feasible to retrofit these existing services with the new generic functions. Therefore, this application refers to new services as the preferred use of the API generic functions and generic session layer protocol.

C. Generic Service Access Functions

The generic functions are referred to herein as magic service access functions; meaning any new services can be setup and used on the operator services network using these functions. The "magic" in magic service is intended to represent any service that is to be added to the operator services network.

The set of generic functions of the present invention is capable of accommodating any new or future service that is to be added to the operator services network. This set of generic functions anticipates any and all interactions that are or will be needed in the interoperation between a client application and a service. To accomplish this feat, Applicants have identified the requisite interactions between the client application and the service and established functions that are of a scope broad enough that by using any or all combination of generic functions, a new service can be brought onto the operator services network Therefore, new function calls do not have to be created each time a new service type is introduced into the operator services network. If a particular service has additional features beyond those accommodated by the generic function calls, then accommodations can be made at the client application level rather than at the network level where complex standards and protocols need to be complied with.

The generic functions of the present invention are as follows:

1. Self Contained Model
   Function Call No. 1: client_open_service
   Function Call No. 2: client_send
   Function Call No. 3: client_receive
   Function Call No. 4: client_close_service
2. ARU Style Model
   Function Call No. 5: client_open_service_phase_1
   Function Call No. 6: client_open_service_phase_2
   Function Call No. 7: client_aru_send
   Function Call No. 8: client_close_service_phase_1
   Function Call No. 9: client_close_service_phase_2

Generic function call nos. 1–9 are preferably written in C programming language and located in the client API of the client application. Function Nos. 1–4 are written for the self contained style model and functions 5–9 are written for the ARU style model. The messages sent by these functions between the client and server are represented in FIG. 13 by horizontal arrows; the ARU style model is shown on the left and the self contained model is shown on the right. The primary difference between the generic functions in the self contained model and the ARU style model is that the messaging queue is located in the client application in the ARU style model, whereas in the self contained model, the message queue is located in the client API of the client application. This difference is illustrated in FIG. 13 because all the arrows representing the functions calls in the ARU style model originate and terminate in the application. As well, the open service and close service in the ARU style model require two phases, phase 1 and phase 2 due to the location of the messaging queue in the application rather than in the API, as in the self contained model. The location of the messaging queue, for purposes of comparison, is illustrated in FIGS. 11 and 12.

The arrows represent a unique set of generic transactions and exchanges (called primitives) between the client application and service/server for the magic service type. The session and transport layers have been modified to accommodate these generic transactions and exchanges in accordance with conventional practice. When a generic function is called, the associated transactions and exchanges for the called function are initiated and carried out without any further intervention by, for example, the application programmer. Because this set of generic functions can be relied on to introduce any new service onto the operator services network, network protocol layers no longer need to be changed to accommodate new services, new functions in the API do not need to be created and new primitives do not have to be developed.

1. Self Contained Model
   Generic Function 1: client_open_service(S)

The purpose of function 1 is to open a service that is located on the server. A response message returns a success for correct execution and a failure returns an error code. Generally, this function opens a session and allocates resources.

Function 1 also includes the following parameters: a magic handle, a service number and a service name. This information is supplied or assigned by, for example, the user to the application or the server. Memory for the magic handle is allocated by the calling application. The magic handle is a formal parameter of a C programming function that identifies a client context (particular connection). The magic handle is passed by the calling application as a pointer to the API in which the generic functions are located. The magic handle will be passed with each data transfer, as discussed with reference to function 2. A service name "S" indicates the service to be opened. The server number indicates the number of the server. The service number is passed back from the server to generic function 1 and is stored in the magic handle, as will be discussed below.

In operation, the calling application communicates with a service on a server by initiating a function call 1. Function call 1 generates the communications shown by arrows 1310, 1312, 1314 and 1316.

The communication from the application to the server is shown by arrow 1310 and is made to obtain the service number of the server. The service number is then sent back to the API, as shown by arrow 1312, and stored in the magic handle. Now, the API can establish communication with the service on the server.

Function call 1 then generates an open magic service request to the CLPROC. The CLPROC generates a network message to the service on the server as shown generally by the arrow 1314. The server acts on the open magic service request and sends a response message, shown by arrow 1316, back from the service to the API and then the client application. The communication shown by arrow 1316 indicates successful connection establishment with the service or an unsuccessful connection establishment with the service.

Notably, in the self contained model, only one function call needs to be initiated by the calling application because the message queue is stored in the API as discussed with reference to FIGS. 11 and 12. In contrast, as will be discussed below, in the ARU style model, two function calls must be initiated by the application to establish connection with the service.

The following provides syntax and C programming code parameters intended to assist in implementing function 1.

Syntax include <.h>
include <.h>

C Program Code

| USHORT client_open_service | (VOID *pstMagicHandle, CHAR achServiceName[12], CHAR achServerName[12]) |
|---|---|

Parameters

*pstMagicHandle

This parameter identifies client context (particular connection), allocated by the calling application via malloc'ed space (this is a C call; if pass number of bytes needed, will pass memory block back). The calling application will do the free'ing (clearing out the block of memory marked my malloc'ing).

achServiceName[12]

Service to be opened (ASCII string indicating the service located in the nids.cfg file).

achServerName[12]

Server to be connected (ASCII string indicating the server located in the nids.cfg file).

Generic Function 2: client_send(S)

The purpose of function 2 is to send a packet to a service. Function 2 returns the status of the response message to the API.

Function 2 sends data to a service S. Calling function 2 needs to pass with it the magic handle associated with the connection. The API and CLPROC deliver this packet to the service. If no response is required by the function call, then the communication is shown by arrow 1318. However, if a response is required, then the client_send communication is shown by arrow 1320 and the response is shown by arrow 1322. The response is sent to the client API. The functional transfer between the API and the CLPROC is illustrated in FIG. 11.

The following provides syntax and C programming code parameters intended to assist in implementing function 2.

Syntax include <.h>
include <.h>

C Program Code

| USHORT client_send | (VOID *pMagicHandle, ULONG *uluniqueid, MDATASTRUCT data, USHORT usInMsg, BOOL response_required CHAR *pchServerName) |
|---|---|

Parameters pstMagicHandle

This parameter points to a magic handle. This parameter allows all information associated with this magic connection to be found within one context and to be passed in and out of each API request to obtain data.

uniqueid

Passed back so can be used in readq.

data

Contains both data length and data, no dynshm.

response_required

Determines subservice type.

*pchServerName

The server name to send the insert to or "" for the client to try servers if necessary.

Generic Function 3: client_receive(S)

Function 3 allows for the checking of messages on the message queue (shown in FIG. 11). Function 3 returns the status of the response message to the API.

Function 3 allows the application to do unblocked or blocked polling of the application queue messages at the service. Function 3 initiates the return of a status response message to the API shown as arrow 1324, which, in turn, is returned to the application as shown by arrow 1326. It is noted, however, that a high rate of use in the unblocked mode will cause performance degradation.

The following provides syntax and C programming code parameters intended to assist in implementing function 3.

Syntax include <.h>
include <.h>

C Program Code

| USHORT client_receive | (VOID **psMagicHandle, USHORT *usmessagetype, ULONG uluniqueid, MDATASTRUCT *data, BOOL bBlockOnRead) |
|---|---|

Parameters pstMagicHandle

A pointer to a magic handle. Allows all magic connection information to be found within one context and to be passed in and out of each API request to obtain data.

messageType

Passed back to indicate the type (magic type).

data

Contains both data length and data.

uniqueid

Passed in to read for a certain uniqueid.

blockOnRead

Determines message blocking status.

Generic Function 4: client_close_service(S)

The purpose of function 4 is to dose the service and free the associated resources. Generally, function 4 closes a session and re-allocates resources.

Function 4 involves four communications shown by arrows 1328, 1330, 1332 and 1334. The application calls function 5 to close access to the service as shown by arrow 1328. The service returns a response message to the API indicating that the service has been disassociated. The API then closes the server as shown by arrow 1332. The server returns a response to the application indicating that the server has been disassociated.

The following provides syntax and C programming code parameters intended to assist in implementing function 4.

Syntax include <.h>
include <.h>
C Program Code

```
USHORT client_close_service (VOID  *pstMagicHandle,
                             CHAR  achServerName[12])
```

Parameters
pstMagicHandle

A pointer to a magic handle. Allows all magic connection information to be found within one context and to be passed in and out of each API request to obtain data.
achServerName[12]

Server to be closed (ASCII string indicating the server located in the nids.cfg file)

2. ARU Style Model

Now, a discussion of the generic functions associated with the ARU style model will be discussed with reference to the left side column shown in FIG. 13. Reference to FIG. 12 may assist in understanding the following functions.

Generic Function 5: client_open_service_phase_1 (S)

Function 5 provides an ARU style function call to the server, which includes the magic service type.

The application calls function 5. Function call 5 sends an open request shown by arrow 1336 to the server via the CLPROC, which will start the session and pick request to the service indicated. The magic handle is allocated by the calling application and is passed as a pointer to this API. The service name is passed as the last parameter and indicates the service to be opened. The service number is passed as the last parameter and indicates the service that is to be opened. The service number is passed back to the application in response to the open request made by function 5 as shown by arrow 1338. The service number is stored in the magic handle entry.

The following provides syntax and C programming code parameters intended to assist in implementing function 5.

Syntax include <.h>
include <.h>
C Program Code

```
USHORT client_open_service_phase_1
                            (USHORT usUniqueID,
                             VOID    *pstMagicHandle,
                             CHAR    achServiceName[12],
                             CHAR    achServerName[12])
```

Parameters
usUniqueID

A number used to identify the server response. The usUniqueID of a request and the response will match.
*pstMagicHandle Identifies the client context, allocated by the calling application via malloc'ed space. The calling application will also do free'ing.

achServiceName[12]

Service to be opened (ASCII string indicating the service located in the nids.cfg file).
achServerName[12]

Server to be opened (ASCII string indicating the server located in the nids.cfg file).
Response Message
sService=9
sSubservice=0
sServiceNumber=Depends on service opened
sRetCode=SUCCESS or FAILURE (0 or −1)

Generic Function 6: client_open_service_phase_2 (S)

The calling application initiates function 6 to generate an ARU style call to the service. Function call 6 generates an open service request to the magic service type. The communication is shown generally by arrow 1340. In particular, function 6 sends a request to the CLPROC to accomplish opening of the requested service. Function call 6 returns a response indicating the status of the open service request. The response is sent from the service to the application as shown by arrow 1342. The status is success or failure.

The following provides syntax and C programming code parameters intended to assist in implementing function 6.

Syntax include <.h>
include <.h>
C Program Code

```
USHORT client_open_service_phase_2
                            (USHORT usUniqueID,
                             VOID    *pstMagicHandle,
                             CHAR    achServerName[12])
```

Parameters
usUniqueID

A number used to identify the server response. The usUniqueID of a request and the response will match.
*pstMagicHandle Identifies the client context, allocated by the calling application via malloc'ed space. The calling application will also do free'ing.
achServerName[12]

Server to be connected (ASCII string indicating the server located in the nids.cfg file).
Response Message
sService=9
sSubservice=1
sServiceNumber=Depends on service opened
sRetCode=SUCCESS or FAILURE (0 or −1)

Function 7: client_aru_send(S) (ARU Style)

The purpose of function 7 is to provide an ARU style call for sending a data transmission to the service. This communication is shown generally by arrow 1344, or 1346 and 1348 and/or 1350. Specifically, function 7 generates a request to the CLPROC, which sends a data transmission to the service indicated. A request without a response is shown by arrow 1344 and a request with a response requested is shown by arrow 1346. The response is shown by arrow 1348. A unsolicited response by the service is shown by arrow 1350.

The following provides syntax and C programming code parameters intended to assist in implementing function 7.

Syntax include <.h>
include <.h>

C Program Code

```
USHORT  client_aru_send
        (VOID           *pstMagicHandle,
        USHORT          usuniqueid,
        MDATASTRUCT     data,
        ushort          usInMsg,
        BOOL            response_required)
        CHAR            *pchServerName)
```

Parameters
*pstMagicHandle
Identifies the client context, allocated by the calling application via malloc'ed space. The calling application will also do free'ing.
usUniqueID
A number used to identify the server response. The usUniqueID of a request and the response will match.
data
Passed to the API to indicate the number of bytes in the message and a pointer to the data.
usInMsg
Usually set to zero.
response_required
Indicates if a response is required (1=yes, 0=no).
*pchServerName
The server name to send the insert to or "" for the client to try servers if necessary.
Response Message
sService=9
sSubservice=many possibilities
sRetCode=SUCCESS or FAILURE (0 or −1)

Generic Function 8: client_close_service_phase_1 (S)

Function 8 provides an ARU style call to dose a service. Function call 8 sends a request to dose to the service as is shown by arrow 1352. Specifically, function 8 sends a request to the CLPROC, which sends the request to the service. Function 8 returns the status (e.g., successful or not successful) of the close service request as shown by arrow 1354.

The following provides syntax and C programming code parameters intended to assist in implementing function 8.
Syntax
include <.h>
include <.h>
C Program Code

```
USHORT  client_close_service_phase_1
        (USHORT     usUniqueID,
        VOID        *pstMagicHandle,
        CHAR        achServerName[12])
```

Parameters
usUniqueID
A number used to identify the server response. The usUniqueID or a request and the response will match.
*pstMagicHandle
Identifies the client context, allocated by the calling application via malloc'ed space. The calling application will also do free'ing.
achServerName[12]
Server to be closed (ASCII string indicating the server located in the nids.cfg file).
Response Message
sService=9
sSubservice=6
sRetCode=SUCCESS or FAILURE (0 or −1)

Generic Function 9: client_close_service_phase_2 (S)

The purpose of function 9 is to provide an ARU style call to dose the connection between the application and the server as shown by arrow 1356. Function call 9 generates a request to the CLPROC, which sends the request to the server. A response is sent from the server to the application as shown by arrow 1358. The response includes the successfulness of the closing of the service.

The following provides syntax and C programming code parameters intended to assist in implementing function 9.
Syntax
include <.h>
include <.h>
C Program Code

```
USHORT  client_close_service_phase_2
        (USHORT     usUniqueID,
        VOID        *pstMagicHandle,
        CHAR        achServerName[12])
```

Parameters
usUniqueID
A number used to identify the server response. The usUniqueID of a request and the response will match.
*pstMagicHandle
Identifies the client context, allocated by the calling application via malloc'ed space. The calling application will also do free'ing.
achServerName[12]

D. Server Data Transfer

The server may transfer data to the client application in accordance with the present invention. Similar to the client API function calls, function calls may be included in the server API. For example, a server initiated data transfer may be initiated with a response requested or without a response requested.

Operation

In operation, with the present invention, an application developer can install a new service on the network simply by utilizing the set of generic functions 1–9. The application developer can pick and chose functions in accordance with the needs of the new service. Unlike existing functions associated with existing services, which are tailored to the specific service, the generic functions carry out broad based functionalities and rely on generic session layer protocol. Instead of tailoring the needs of the service at the network level, the nuances of the new service can be accommodated in the application itself by using for example, flags.

Conclusion

While the invention has been particularly shown and described with reference to preferred embodiments thereof; it will be understood by those skilled in the art that various changes, from the foregoing and other changes, in form and details may be made therein without departing from the spirit and scope of the invention. For example, the set of generic functions is not exclusive and it is possible that additional generic functions may be added in accordance with the principles and scope of the invention as defined by the appended claims.

What is claimed is:

1. A method for accessing a service on a services network using a set of generic functions and a generic session layer protocol, wherein the generic functions and generic session layer protocol can be used with any new service, said method comprising the steps of:

(1) calling a first function to establish a connection between an application and the service, wherein the first function resides in an application interface and said step of calling a first function includes sending a connection identifier and a service identifier;

(2) calling a second function to transfer a packet between the application and the service, wherein the second function resides in the application interface and said step of calling a second function includes sending a connection identifier and data; and (3) calling a third function to terminate the connection between the application and the service, wherein the third function resides in the application interface and said step of calling a third function includes sending a connection identifier and a server identifier.

2. A method according to claim 1, wherein step (1) comprises the steps of:

sending a service number request from the application to a server on which the service resides to obtain a service number;

sending a service number response from the server to the application interface;

sending an open service request to the service; and sending a response from the service to the calling application.

3. A method according to claim 1, wherein step (2) comprises the steps of:

sending the packet from the calling application to the service.

4. A method according to claim 1, wherein step (2) comprises the steps of:

sending the packet and a response request from the calling application to the service;

sending a response to the application interface; and sending the response from the application interface to the calling application.

5. A method according to claim 1, wherein steps (1), (2) and (3) are called by the application and step (3) comprises the steps of:

sending a termination request from the calling application to the service; and sending a response from the service to the calling application.

6. A system for setting up a new service on a services network using a set of generic functions and a generic session layer protocol, wherein the generic functions and generic session layer protocol can be used with any new service, the system comprising:

a first means for establishing a connection between an application and the service, wherein the first means resides in an application interface and said means for establishing comprises means for sending a connection identifier and a service identifier;

a second means for transferring a packet between the application and the service, wherein the second means resides in the application interface and said means for transferring includes means for sending a connection identifier and data; and a third means for terminating the connection between the application and the service, wherein the third means resides in the application interface and said means for terminating includes means for sending a connection identifier and a server identifier.

7. A system according to claim 6, wherein said first means comprises:

means for sending a service number request from the application to a server on which the service resides to obtain a server number;

means for sending a service number response from the server to the application interface;

means for sending an open service request to the service; and means for sending a response from the service to the calling application.

8. A system according to claim 6, wherein said second means comprises:

means for sending a packet from the calling application to the service.

9. A system according to claim 6, wherein said second means comprises:

means for sending a packet from the calling application and a response request to the service;

means for sending a response to the application interface; and means for sending the response from the application interface to the calling application.

10. A system according to claim 6, wherein said third means comprises:

means for sending a termination request from the calling application to the service; and means for sending a response from the service to the calling application.

11. A program storage device readable by a machine, tangibly embodying a program of instructions executable by the machine to perform generic method steps for establishing access between an application and a service in an operator services network, said method steps comprising:

(1) calling a first function to establish a connection between an application and the service, wherein the first function resides in an application interface and said step of calling a first function includes sending a connection identifier and a service identifier;

(2) calling a second function to transfer data between the application and the service, wherein the second function resides in the application interface and said step of calling a second function includes sending a connection identifier and data; and (3) calling a third function to terminate the connection between the application and the service, wherein the third function resides in the application interface and said step of calling a third function includes sending a connection identifier and a server identifier.

12. A program storage device readable by a machine according to claim 11, wherein steps (1), (2) and (3) are called by the application and said step (1) comprises the steps of:

sending a service number request from the application to a server on which the service resides to obtain a service number;

sending a service number response from the server to the application interface;

sending an open service request to the service; and sending a response from the service to the calling application.

13. A program storage device readable by a machine according to claim 11, wherein steps (1), (2) and (3) are called by the application and said step (2) comprises the steps of:

sending a packet from the calling application to the service.

14. A program storage device readable by a machine according to claim 11, wherein steps (1), (2) and (3) are called by the application and said step (2) comprises the steps of:

sending a packet from the calling application and a response request to the service;

sending a response to the application interface; and sending the response from the application interface to the calling application.

15. A program storage device readable by a machine according to claim 11, wherein steps (1), (2) and (3) are called by the application and said step (3) comprises the steps of:

sending a termination request from the calling application to the service; and sending a response from the service to the calling application.

\* \* \* \* \*